(12) United States Patent
Motoi et al.

(10) Patent No.: US 11,091,068 B2
(45) Date of Patent: Aug. 17, 2021

(54) BACK FRAME

(71) Applicant: TOYOTA BOSHOKU KABUSHIKI KAISHA, Aichi (JP)

(72) Inventors: Yoshihiro Motoi, Aichi (JP); Yoshiro Hara, Aichi (JP); Masanori Ogihara, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/803,255

(22) Filed: Feb. 27, 2020

(65) Prior Publication Data
US 2020/0282875 A1 Sep. 10, 2020

(30) Foreign Application Priority Data
Mar. 5, 2019 (JP) .............................. JP2019-039506

(51) Int. Cl.
*B60N 2/22* (2006.01)
*B60N 2/90* (2018.01)

(52) U.S. Cl.
CPC ........... *B60N 2/2227* (2013.01); *B60N 2/938* (2018.02)

(58) Field of Classification Search
CPC .............................. B60N 2/2227; B60N 2/938
See application file for complete search history.

(56) References Cited

U.S. PATENT DOCUMENTS

| 5,320,308 | A | * | 6/1994 | Bilezikjian | .......... | B64D 11/064 244/122 R |
| 7,871,127 | B2 | * | 1/2011 | Bruck | .................... | B60N 2/305 297/378.11 |
| 9,010,862 | B2 | * | 4/2015 | Yamaguchi | .............. | B60N 2/68 297/367 R |
| 2004/0021355 | A1 | | 2/2004 | Ohba | | |
| 2012/0325780 | A1 | | 12/2012 | Kushiyama et al. | | |
| 2017/0210246 | A1 | * | 7/2017 | Kubota | ................ | B60N 2/0232 |
| 2018/0213936 | A1 | * | 8/2018 | Sasaki | ...................... | B60N 2/20 |

FOREIGN PATENT DOCUMENTS

| JP | 2004-058928 | 2/2004 | |
| JP | 2013-027922 | 2/2013 | |
| JP | 2018-192861 | 12/2018 | |
| WO | WO-2016163286 A1 * | 10/2016 | ............. B60N 2/224 |

* cited by examiner

*Primary Examiner* — Timothy J Brindley
(74) *Attorney, Agent, or Firm* — Greenblum & Bernstein, P.L.C.

(57) ABSTRACT

A back frame, which forms a framework of a seatback, includes a back side frame, a stopper, and an extending portion. The back side frame is rotatable with respect to a cushion frame in seat front-rear directions. The stopper is fixed to the back side frame and includes a contact portion. When the contact portion contacts a contact target portion that is immobile with respect to the cushion frame, the stopper restricts rotation of the back side frame. The extending portion extends from the stopper in the seat front-rear directions. The extending portion is fixed to the back side frame in at least a part of the extending portion.

4 Claims, 9 Drawing Sheets

BACK FRAME

CROSS-REFERENCE TO RELATED APPLICATIONS

The present application claims the benefit of Japanese Patent Application No. 2019-039506 filed on Mar. 5, 2019 with the Japan Patent Office, the entire disclosure of which is incorporated herein by reference.

BACKGROUND

The present disclosure relates to a back frame that forms a framework of a seatback.

As disclosed in Japanese Unexamined Patent Application Publication No. 2013-27922, a back side frame of a back frame is rotatable with respect to a cushion frame in seat front-rear directions. The back side frame is a tower-like frame that is a part of the back frame.

SUMMARY

In general, the back side frame is provided with a stopper that is used to restrict rotation of the back side frame. The stopper contacts a contact target portion such as a stop plate that is immobile with respect to the cushion frame, to thereby restrict rotation of the back side frame.

Therefore, a moment acts on the stopper in a state where the stopper is in contact with the contact target portion. The moment arises around an axis that is approximately parallel to a longitudinal axis of the back side frame. If the moment repeatedly acts on the stopper, there may be a risk of occurrence of cracks in a portion of the back side frame to which the stopper is fixed.

One example of countermeasure for such cracks is to increase a thickness of a member that configures the back side frame. However, this countermeasure may have a risk of causing issues, such as increases in production cost and mass of the back side frame.

The present disclosure provides an example of a back side frame that can inhibit occurrence of cracks and, at the same time, can inhibit increases in production cost and mass of the back side frame.

According to one aspect of the present disclosure, a back frame, which forms a framework of a seatback, comprises a back side frame, a stopper, and an extending portion. The back side frame is rotatable with respect to a cushion frame in seat front-rear directions. The stopper is fixed to the back side frame and includes a contact portion configured to contact a contact target portion that is immobile with respect to the cushion frame. The stopper restricts rotation of the back side frame when the contact portion contacts the contact target portion. The extending portion extends from the stopper in the seat front-rear directions and is fixed to the back side frame in at least a part of the extending portion.

With the above configuration, the extending portion can receive the aforementioned moment. Accordingly, stress, which is caused in the back side frame due to the acting of the moment, can be dispersed and the occurring maximum stress can be reduced. Consequently, it is possible to obtain the back side frame that can inhibit occurrence of cracks and inhibit increases in production cost and mass of the back side frame.

The back side frame may be configured as follows.

Preferably, the back side frame comprises a stopper fixing portion and a welding area. The stopper fixing portion extends from the stopper toward a leading end of the back side frame along a longitudinal axis of the back side frame. The stopper fixing portion is welded and fixed to the back side frame. A leading end of the stopper fixing portion along an extending direction of the stopper fixing portion is located closer to the leading end of the back side frame along the longitudinal axis of the back side frame than the extending portion is. In the welding area, the extending portion is welded and fixed to the back side frame. The welding area extends along an extending direction of the extending portion. With this configuration, it is possible to obtain the back side frame that can advantageously inhibit occurrence of cracks.

Preferably, the extending portion includes a fixing wall portion and a reinforcing wall portion. The fixing wall portion is fixed to the back side frame and is shaped in a strip plate to extend along the extending direction of the extending portion. The reinforcing wall portion is shaped in a strip plate to extend along the extending direction of the extending portion and to extend from the fixing wall portion in a direction crossing the fixing wall portion. In this configuration, the extending portion has an increased flexural rigidity, which can advantageously disperse stress occurring in the back side frame.

Preferably, the extending portion is placed in a state where the extending portion extends in a direction oriented from the contact portion toward the contact target portion when the contact portion is in contact with the contact target portion. With this configuration, it is possible to obtain the back side frame that can advantageously inhibit occurrence of cracks.

BRIEF DESCRIPTION OF THE DRAWINGS

Embodiments of the present disclosure will be described hereinafter by way of example with reference to the accompanying drawings, in which.

DETAILED DESCRIPTION OF EXEMPLARY EMBODIMENTS

An embodiment to be described below is one example of embodiments that fall within the technical scope of the present disclosure. Matters specifying the invention recited in claims are not limited to specific configurations, structures, and the like that are shown in the embodiments below.

The present embodiment is an example in which a back frame of the present disclosure is applied to a seat to be mounted in a vehicle such as an automobile (hereinafter, referred to as a "vehicle seat"). Arrows and other marks that indicate the directions labelled on drawings are made for easy understanding of relationships between the drawings and for easy understanding of shapes and the like of members and/or portions shown in the drawings.

Therefore, the back frame is not limited to the directions labelled on the drawings. The directions shown in the drawings are based on a state where the vehicle seat of the present embodiment is assembled to a vehicle.

At least in respect of a member or a portion that is labelled with a reference numeral for explanations, there is at least one in number of such a member or a portion unless the number is otherwise specified, for example, as "only one of". In other words, there may be two or more of such a member or a portion when the number is not specified.

First Embodiment

1. Overview of Vehicle Seat

Figure 1:
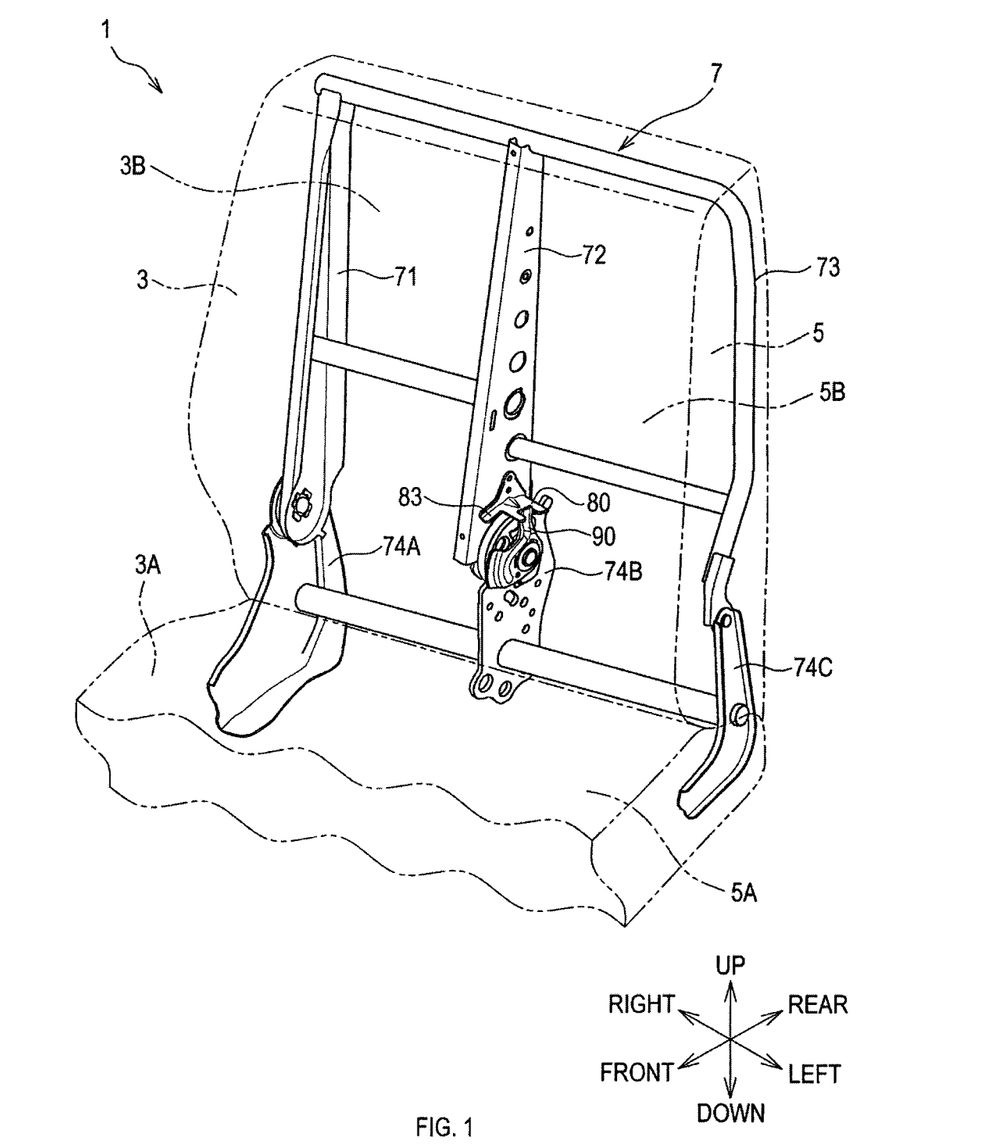
FIG. 1 is a view showing a back frame of a first embodiment.

A vehicle seat 1 shown in FIG. 1 is a vehicle seat for a vehicle rear seat. The vehicle seat 1 is a vehicle seat of bench seat type in which a side seat 3 and a center seat 5 are integrated together.

The side seat 3 is a seat portion of the vehicle seat 1 that is situated on one end side of the vehicle seat 1 along vehicle width axis (the right end side of the vehicle seat 1 in the present embodiment). The center seat 5 is a seat portion of the vehicle seat 1 that is placed adjacent to the side seat 3.

As shown in FIG. 1, the side seat 3 and the center seat 5, respectively, include a seat cushion 3A and a seatback 3B, and a seat cushion 5A and a seatback 5B. The seat cushions 3A and 5A are portions used to support the buttocks and other body parts of an occupant. The seatbacks 3B and 5B are portions used to support the back of the occupant.

A back frame 7 forms respective frameworks of the seatbacks 3B and 5B. The back frame 7 includes at least three back side frames 71 to 73. The back side frames 71 to 73 extend in up-down directions each in a tower-like shape in a standing state shown in FIG. 1.

Specifically, the back side frame 71 and the back side frame 72 form the framework of the seatback 3B. The back side frame 72 and the back side frame 73 form the framework of the seatback 5B.

In other words, the back side frame 72 is used for both the back side frame for the seatback 3B and the back side frame for the seatback 5B. The back side frames 71 to 73, respectively, are coupled to a cushion frame (not shown) via coupling members 74A to 74C.

The coupling members 74A to 74C are immobile with respect to the cushion frame. The cushion frame is a member that forms respective frameworks of the seat cushion 3A and the seat cushion 5A. In other words, a seat frame, which forms a framework of the vehicle seat 1, is configured to include at least the back frame 7, the cushion frame, and the coupling members 74A to 74C.

2. Back Side Frame 2.1 Overview of Back Side Frame and the Like

Figure 2:
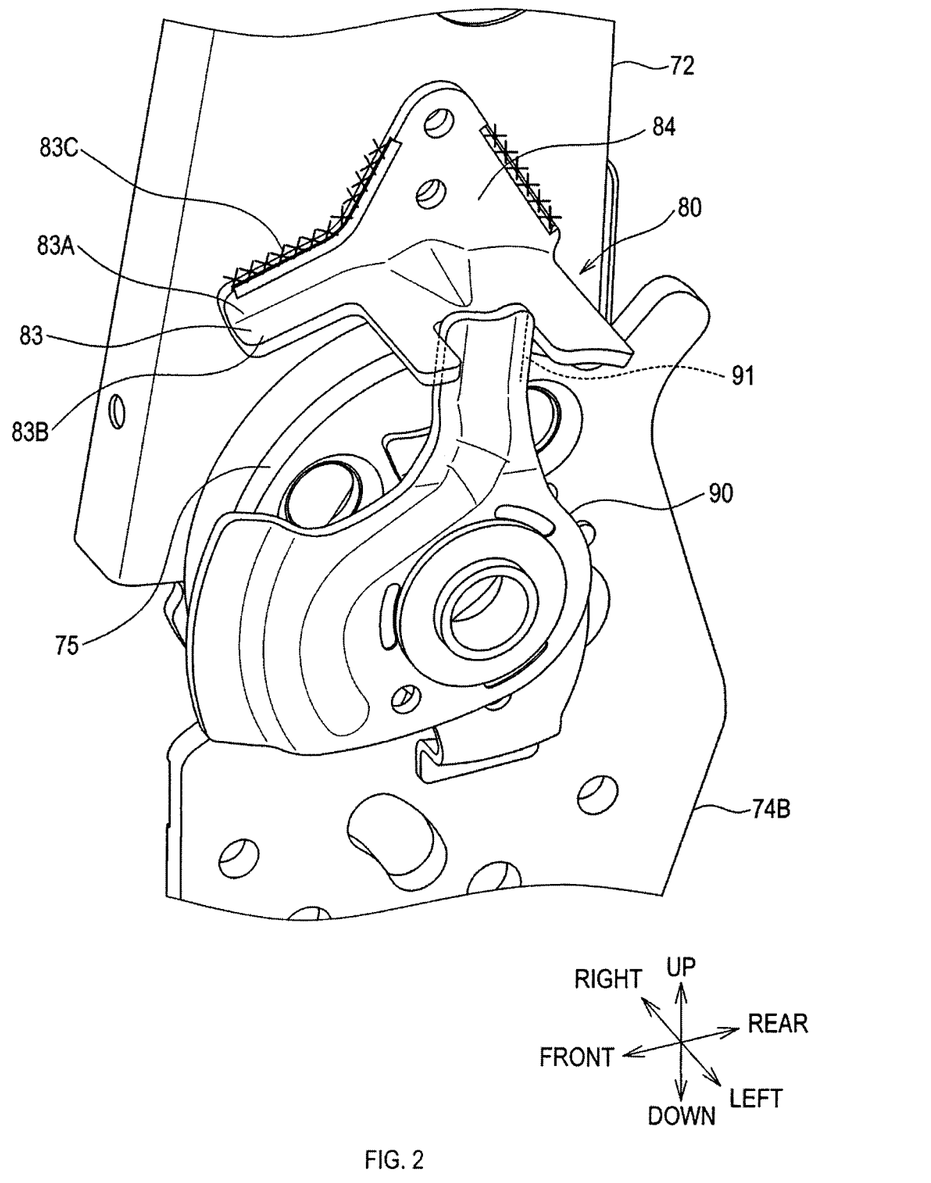
FIG. 2 is a view showing a vicinity of a stopper of the first embodiment.

Hereinafter, descriptions are given in detail to a coupling portion between the back side frame 72 and the coupling member 74B. The coupling portion, which is a part of the back frame 7, is configured to include at least the back side frame 72, the coupling member 74B, a recliner 75, a stopper 80, and a stop plate 90 as shown in FIG. 2.

Figure 3:
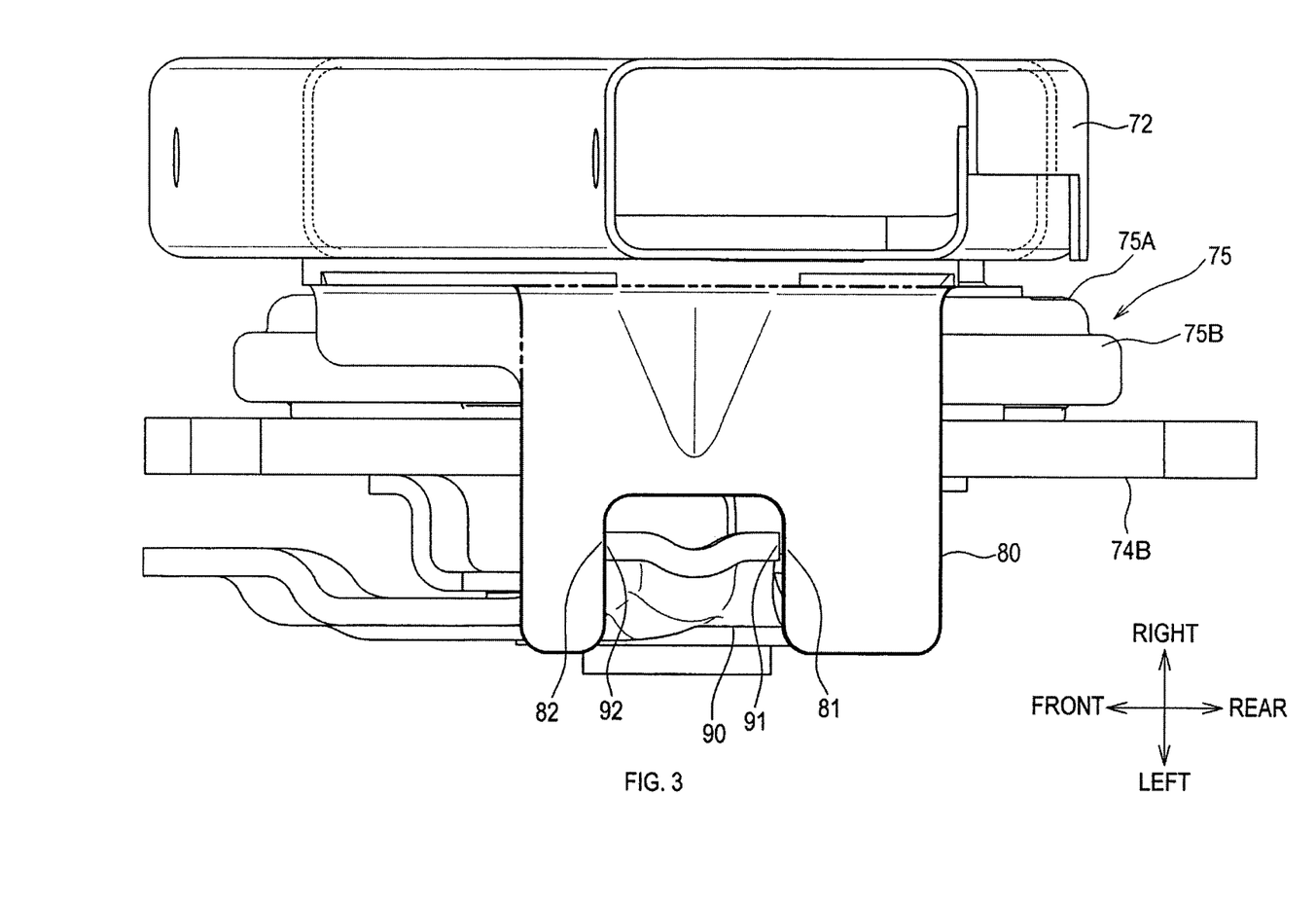
FIG. 3 is a view showing the vicinity of the stopper of the first embodiment.

The back side frame 72 is made of a metal plate member, such as SPCC, SPHC, or the like. As shown in FIG. 3, the metal plate member is bent to draw a closed curve (in a rectangular shape, in FIG. 3), to thereby form the back side frame 72.

The back side frame 72 is fixed to the coupling member 74B via the recliner 75. The recliner 75 is a mechanism for switching the back side frame 72 between a rotatable state and a non-rotatable state.

The recliner 75 includes a movable portion 75A, a fixed portion 75B, and the like. The movable portion 75A is attached to the back side frame 72. The fixed portion 75B is fixed to the coupling member 74B.

When the recliner 75 is placed in the rotatable state, the back side frame 72 is rotatable with respect to the cushion frame. In the non-rotatable state of the recliner 75, the back side frame 72 is not rotatable with respect to the cushion frame. In other words, the back side frame 72 is coupled to the cushion frame via the recliner 75 such that the back side frame 72 can rotate in seat front-rear directions with respect to the cushion frame.

The stop plate 90 is a member that is rotatable in the seat front-rear directions independently from the back side frame 72. Therefore, there may be a case where the back side frame 72 is rotatable with respect to the cushion frame even when the stop plate 90 stops with respect to the cushion frame (hereinafter, such a case is also referred to as a "contactable state").

Figure 4:
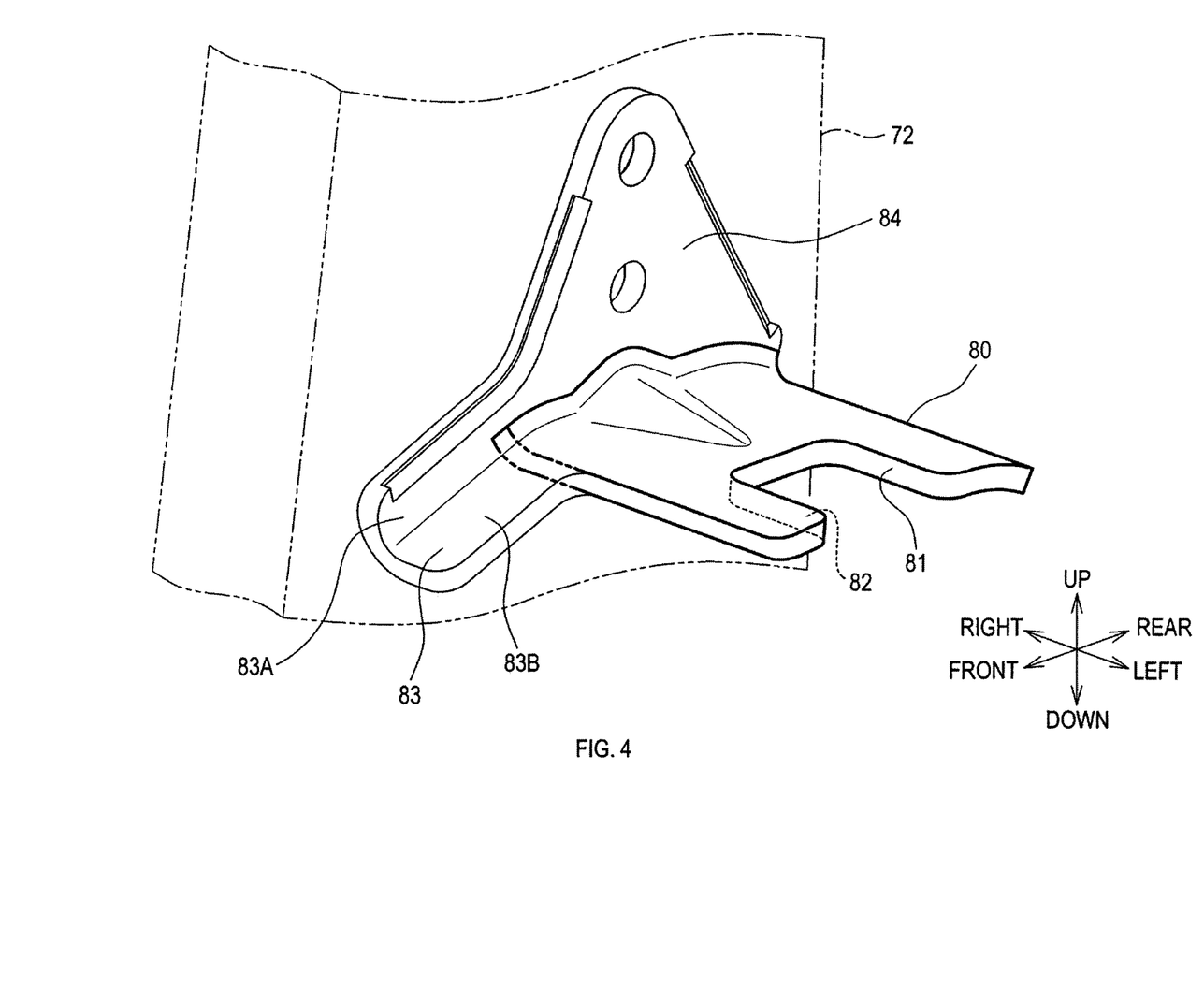
FIG. 4 is a view showing the vicinity of the stopper of the first embodiment.

The stopper 80 corresponds to a portion that is indicated by a thick solid line and a double-dashed line in FIG. 3. As shown in FIG. 4, the stopper 80 is a member that is fixed to the back side frame 72 and that includes a contact portion 81 (a first contact portion) that can contact a contact target portion 91 (a first contact target portion) (see, FIG. 2).

The contact target portion 91 can be placed in an immobile state with respect to the cushion frame. The contact target portion 91 of the present embodiment is provided to the stop plate 90. Therefore, the contact target portion 91 is placed in the immobile state with respect to the cushion frame in the contactable state.

In the contactable state, the contact portion 81 contacts the contact target portion 91 when the back side frame 72 rotates toward a front side of the seat relative to the stop plate 90 and, as a result, rotation of the back side frame 72 is restricted.

FIG. 3 shows a state in which a second contact target portion 92 is in contact with a second contact portion 82. In this state, there exists a gap between the contact target portion 91 and the contact portion 81. Therefore, when the back side frame 72 rotates in the state in which the second contact target portion 92 is in contact with the second contact portion 82, the contact portion 81 collides with the contact target portion 91.

The second contact portion 82 is a part of the stopper 80 and is positioned opposite to the contact portion 81 across the contact target portion 91 in the seat front-rear directions. The second contact target portion 92 is a part of the stop plate 90 and faces the second contact portion 82.

2.2 Details of Stopper and the Like

<Extending Portion>

As shown in FIG. 4, the stopper 80 includes an extending portion 83, a stopper fixing portion 84, and the like. In the present embodiment, the stopper 80, the extending portion 83, and the stopper fixing portion 84 are one-piece article in which these portions are integrally formed by applying deformation processing such as pressing to a single metal plate.

The extending portion 83 extends from the stopper 80 in the seat front-rear directions, and at least a portion of the extending portion 83 is fixed to the back side frame 72. The extending portion 83 of the present embodiment is welded to the back side frame 72.

In other words, the back side frame 72 is provided with a welding area 83C (the area indicated by "× ×" (crossing marks) in FIG. 2) in which the extending portion 83 is welded and fixed to the back side frame 72 as shown in FIG. 2. The welding area 83C extends along an extending direction of the extending portion 83.

The extending direction of the extending portion 83 is oriented from the contact portion 81 toward the contact target portion 91 when the contact portion 81 is in contact with the contact target portion 91. The extending portion 83 of the present embodiment extends toward the front side of the seat when the back side frame 72 is placed in the standing state.

The extending portion 83 includes a fixing wall portion 83A and a reinforcing wall portion 83B. The fixing wall portion 83A is fixed to the back side frame 72 and is shaped in a strip plate to extend along the extending direction of the extending portion 83.

The reinforcing wall portion 83B is a strip plate portion that extends along the extending direction of the extending portion 83 and that extends from the fixing wall portion 83A. The reinforcing wall portion 83B extends from the fixing wall portion 83A in a direction that crosses the fixing wall portion 83A (a direction that is perpendicular to the fixing wall portion 83A in the present embodiment).

Therefore, the extending portion 83 of the present embodiment is configured to have an approximately L-shaped section along the direction that is perpendicular to the extending direction of the extending portion 83. The welding area 83C of the present embodiment is provided to an upper end of the fixing wall portion 83A.

<Stopper Fixing Portion>

The stopper fixing portion 84 extends from the stopper 80 toward a leading end of the back side frame 72 along a longitudinal axis of the back side frame 72 (upward in FIG. 4). A leading end of the stopper fixing portion 84 along its extending direction is located closer to the leading end of the back side frame 72 along the longitudinal axis of the back side frame 72 (upward in FIG. 4) than the extending portion 83 is.

The stopper fixing portion 84 is welded and fixed to the back side frame 72. Specifically, the stopper fixing portion 84 is welded to the back side frame 72 in an area indicated by "× ×" (crossing marks) in FIG. 2.

3. Features of Back Frame (Particularly, Stopper) of the Present Embodiment

The stopper 80 of the present embodiment is provided with the extending portion 83 that extends from the stopper 80 in the seat front-rear directions and that is fixed to the back side frame 72 in at least a part of the extending portion 83.

With the above configuration, the stopper 80 can receive a "moment around an axis that is approximately parallel to the longitudinal axis of the back side frame 72" at the extending portion 83. As a result, stress, which is caused in the back side frame 72 due to the acting of the moment, can be dispersed and the occurring maximum stress can be reduced.

Consequently, the obtained back side frame 72 can inhibit occurrence of cracks while inhibiting increases in production cost and mass of the back side frame 72.

The stopper 80 includes the stopper fixing portion 84 and the welding area 83C. The leading end of the stopper fixing portion 84 along its extending direction is located closer to the leading end of the back side frame 72 along the longitudinal axis of the back side frame 72 than the extending portion 83 is. In the welding area 83C, the extending portion 83 is welded and fixed to the back side frame 72. With this configuration, it is possible to obtain the back side frame 72 that can advantageously inhibit occurrence of cracks.

The extending portion 83 includes the fixing wall portion 83A and the reinforcing wall portion 83B. The fixing wall portion 83A is shaped in the strip plate. The reinforcing wall portion 83B extends in the direction crossing the fixing wall portion 83A. With this configuration, the extending portion 83 has an increased flexural rigidity, so the stress occurring in the back side frame 72 can be advantageously dispersed.

The extending portion 83 extends in the direction oriented from the contact portion 81 toward the contact target portion 91 when the contact portion 81 is in contact with the contact target portion 91. According to this configuration, it is possible to obtain the back side frame 72 that can advantageously inhibit occurrence of cracks.

Second Embodiment

Figure 5:
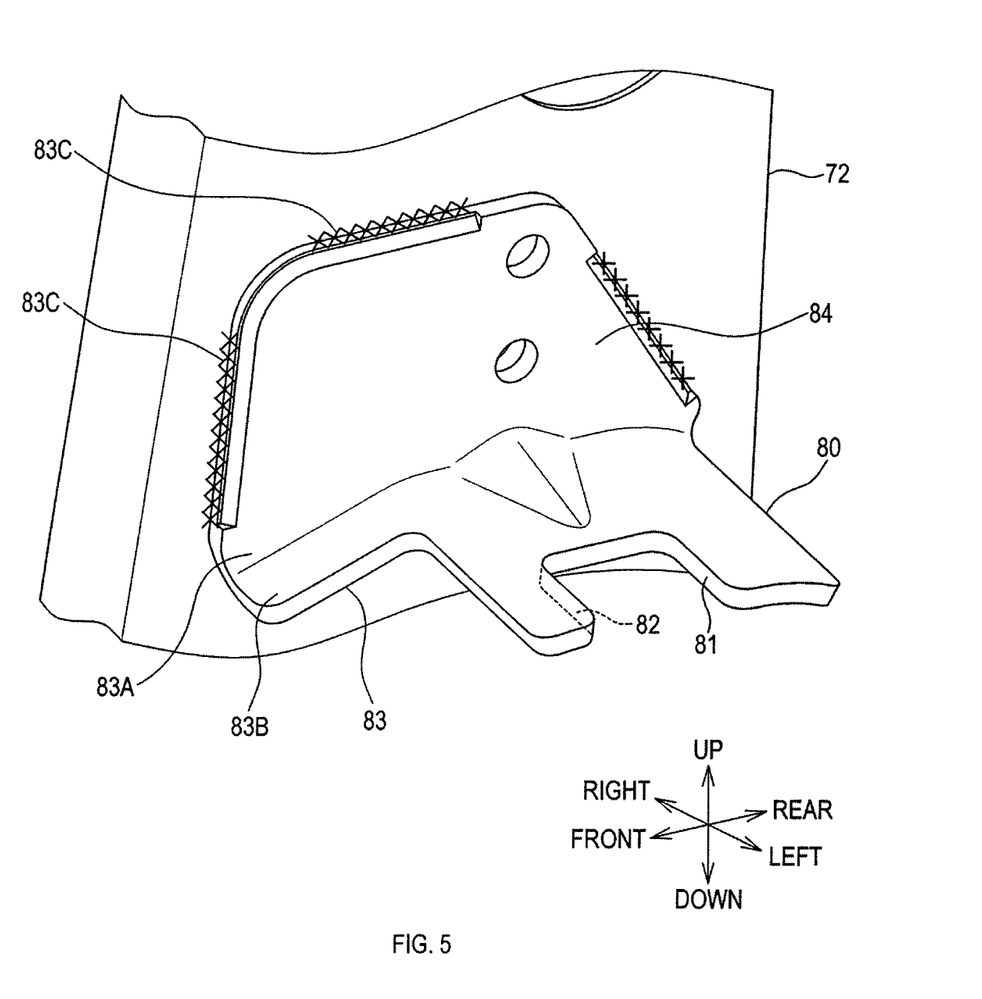
FIG. 5 is a view showing a vicinity of a stopper of a second embodiment.

The fixing wall portion 83A of the present embodiment is, as shown in FIG. 5, configured such that an upper end of the fixing wall portion 83A is situated at approximately the same height as an upper end of the stopper fixing portion 84. The same constituent features and the like as in the above-described embodiment are labelled with the same reference numerals in the above-described embodiment and therefore, overlapping descriptions are omitted in the present embodiment.

In the fixing wall portion 83A of the present embodiment, a contact area between the fixing wall portion 83A and the back side frame 72 is larger than a contact area between the fixing wall portion 83A and the back side frame 72 of the first embodiment. Therefore, the stress occurring in the back side frame 72 can be advantageously dispersed.

Third Embodiment

Figure 6:
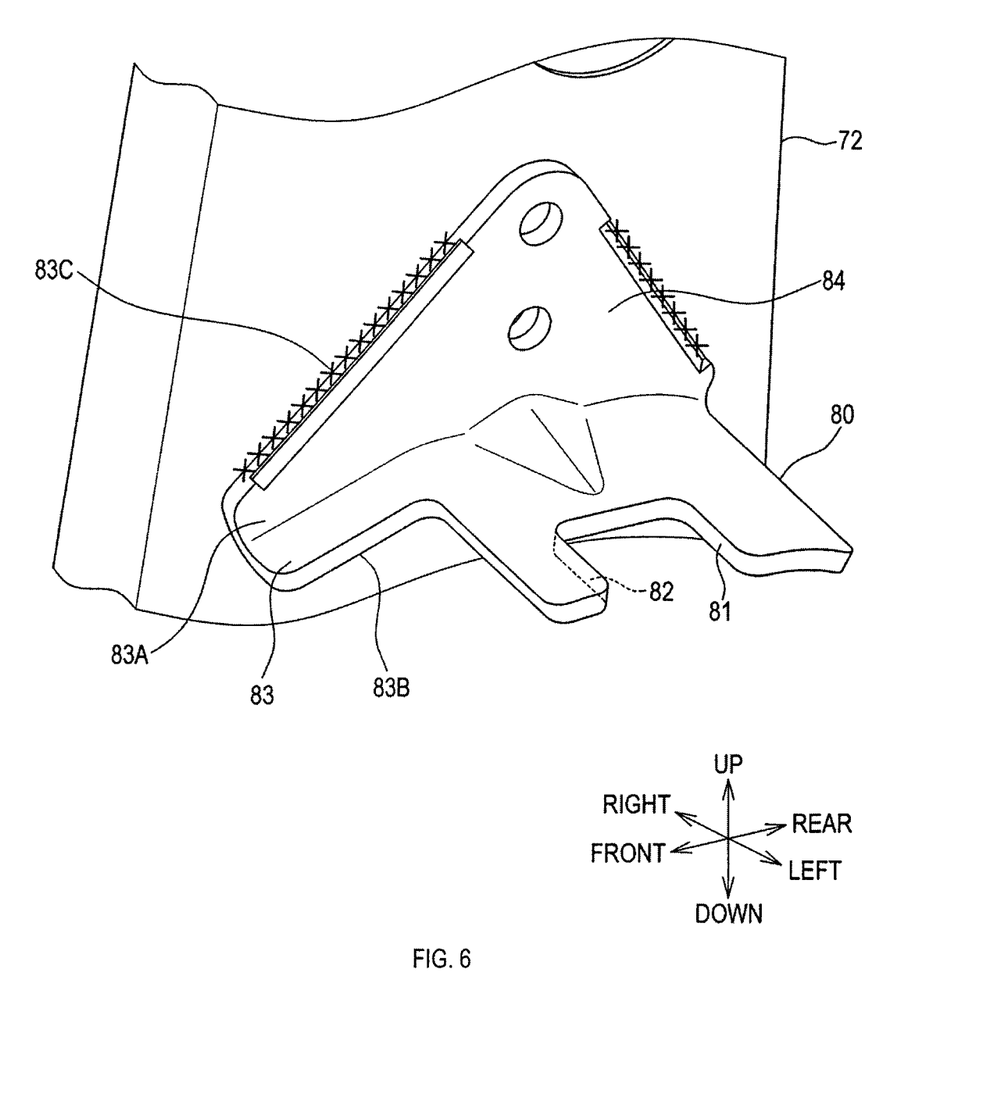
FIG. 6 is a view showing a vicinity of a stopper of a third embodiment.

As shown in FIG. 6, the fixing wall portion 83A of the present embodiment is configured to have an approximately triangular plate shape and is configured such that the upper end of the fixing wall portion 83A is situated at approximately the same height as the upper end of the stopper fixing portion 84.

In the fixing wall portion 83A of the present embodiment, a contact area between the fixing wall portion 83A and the back side frame 72 is larger than the contact area between the fixing wall portion 83A and the back side frame 72 of the first embodiment. Therefore, stress occurring in the back side frame 72 can be advantageously dispersed.

The same constituent features and the like as in the above-described embodiments are labelled with the same reference numerals in the above-described embodiments and therefore, overlapping descriptions are omitted in the present embodiment.

Fourth Embodiment

In the above-described embodiments, the stop plate 90 is provided with the contact target portion 91 and the second contact target portion 92.

Figure 7:
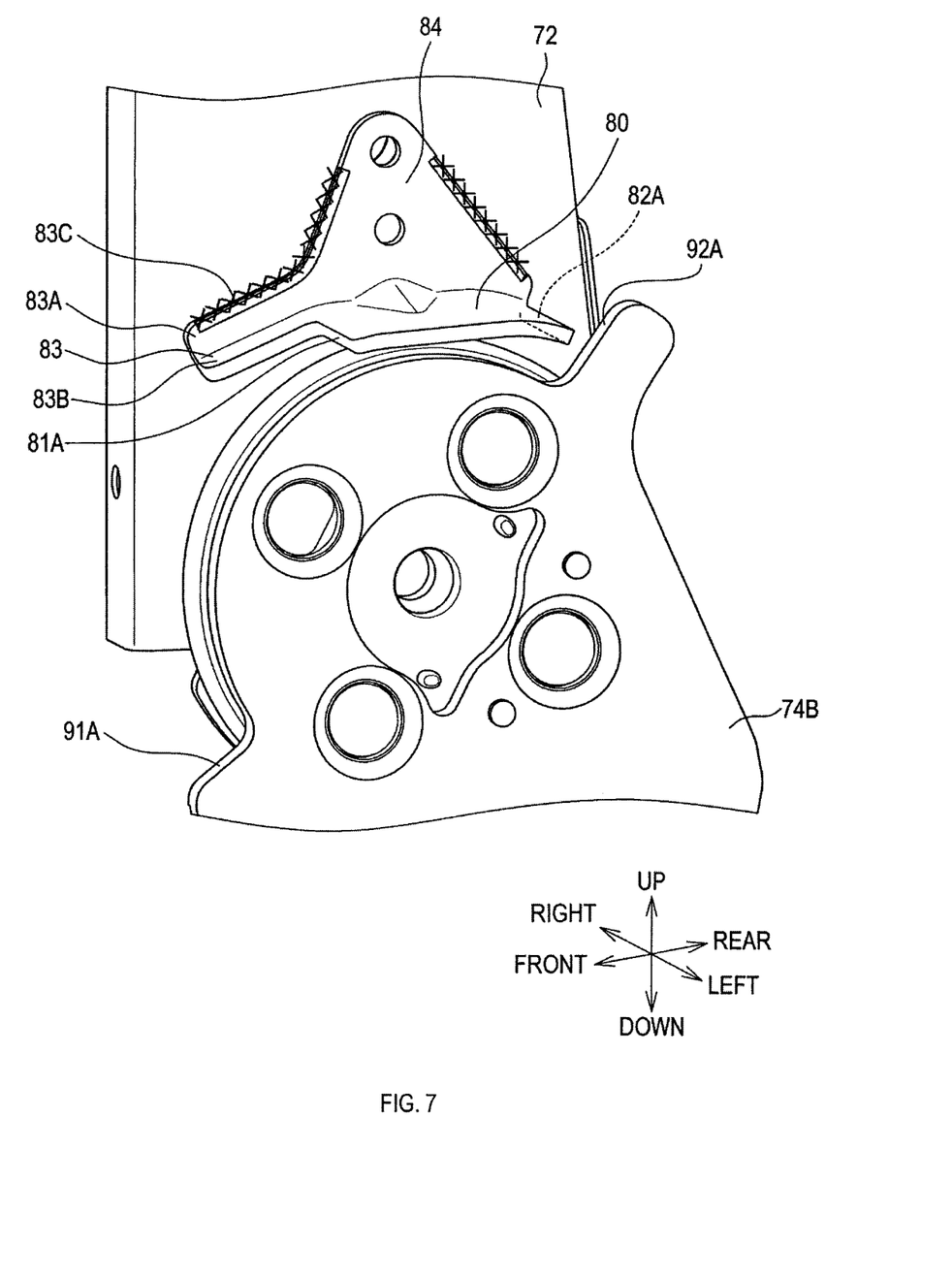
FIG. 7 is a view showing a vicinity of a stopper of a fourth embodiment.
Figure 8:
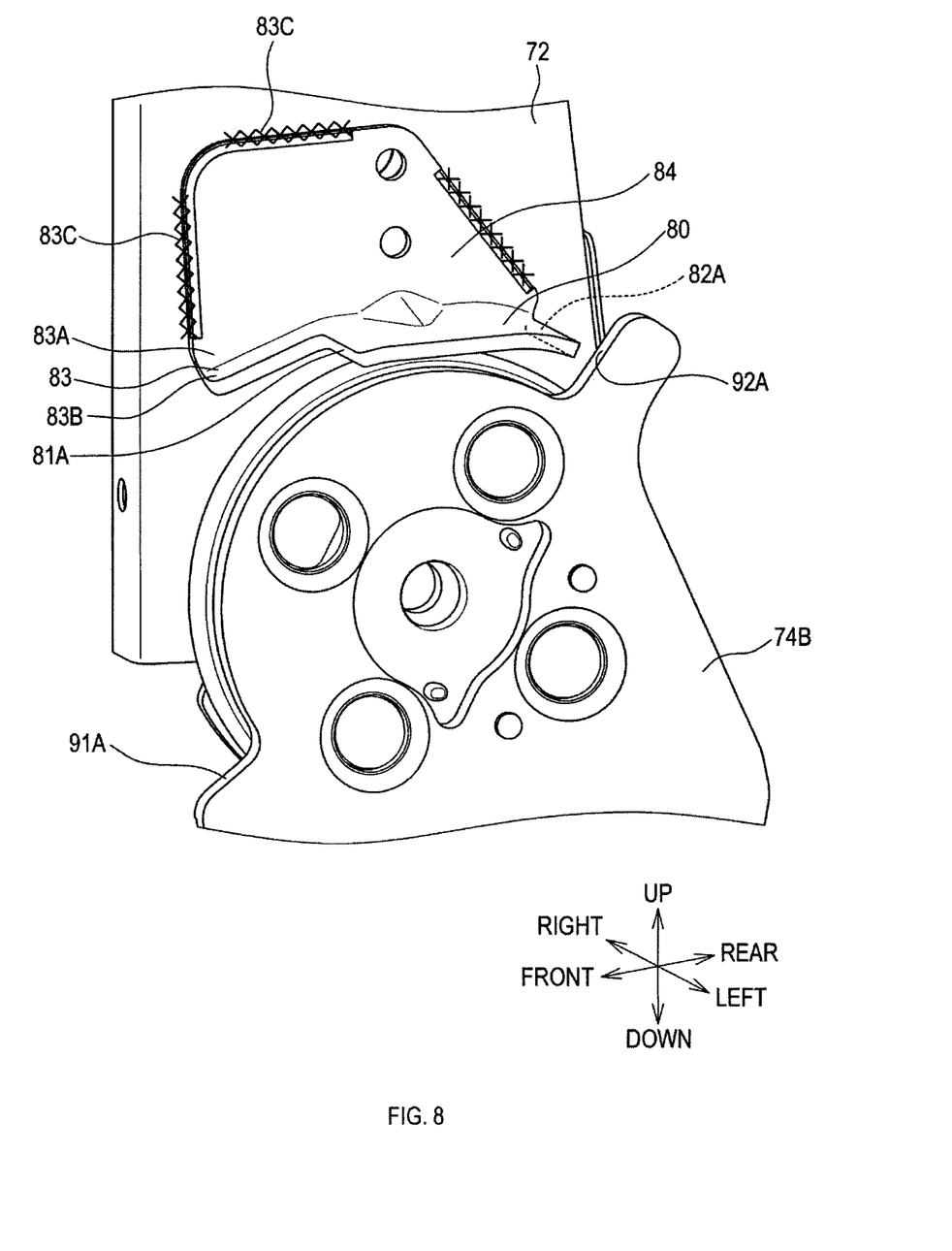
FIG. 8 is a view showing the vicinity of the stopper of the fourth embodiment.
Figure 9:
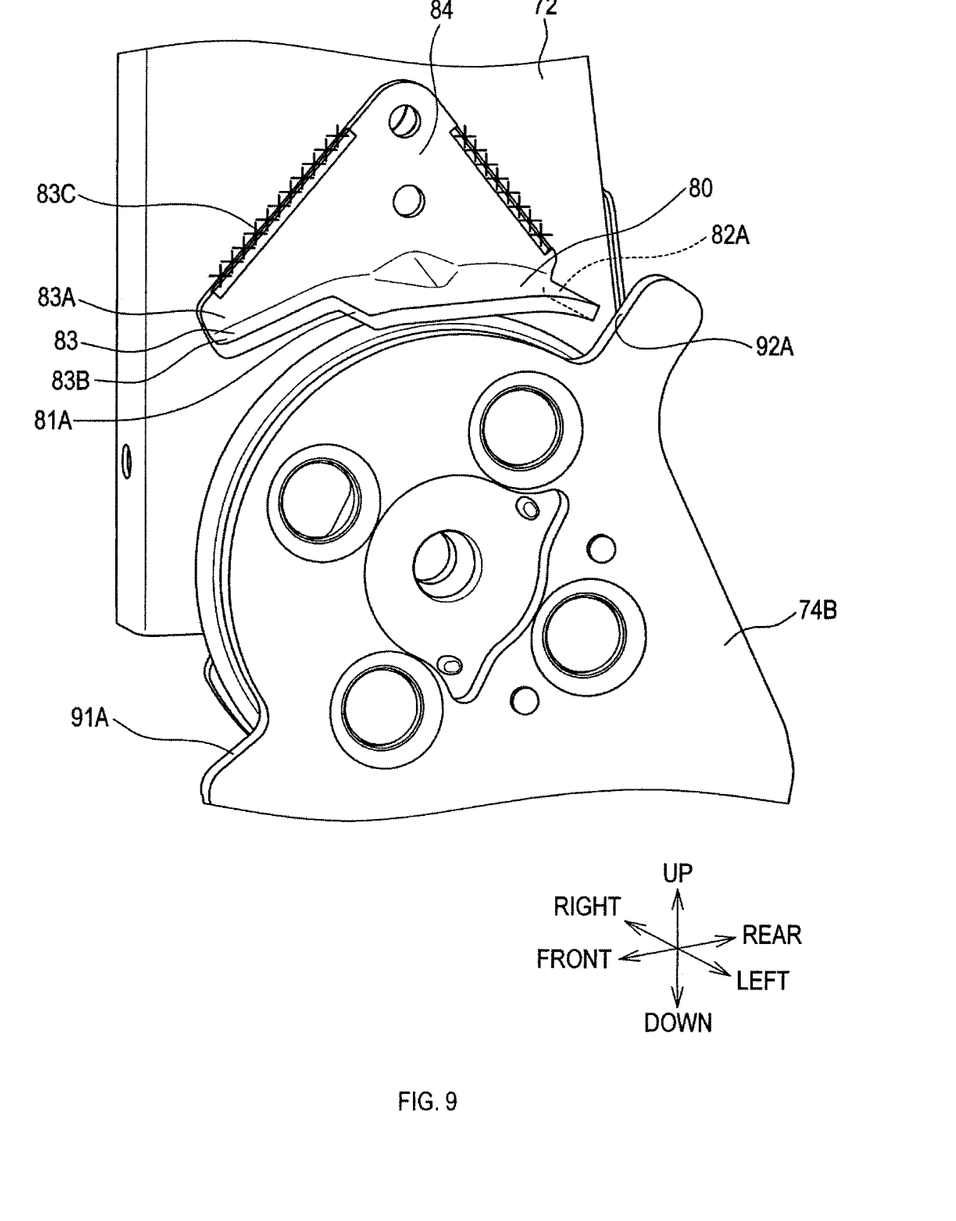
FIG. 9 is a view showing the vicinity of the stopper of the fourth embodiment.

In contrast, in the present embodiment, a contact target portion 91A (a first contact target portion) corresponding to the contact target portion 91 and a second contact target portion 92A corresponding to the second contact target portion 92 are provided to the coupling member 74B, as shown in FIGS. 7 to 9.

A contact portion 81A, which corresponds to the contact portion 81, is provided to a front end surface of the stopper 80 in the seat front-rear directions. A contact portion 82A, which corresponds to the second contact portion 82, is provided to a rear end surface of the stopper 80 in the seat front-rear directions.

FIG. 7 shows an example in which the present embodiment is applied to the first embodiment. FIG. 8 shows an example in which the present embodiment is applied to the second embodiment. FIG. 9 shows an example in which the present embodiment is applied to the third embodiment. The same constituent features and the like in the above-described embodiments are labelled with the same reference numerals in the above-described embodiments and therefore, overlapping descriptions are omitted in the present embodiment.

Other Embodiments

The extending portion 83 of the above-described embodiments extends toward the front side of the seat when the back side frame 72 is placed in the standing state. However, the present disclosure is not limited hereto.

Specifically, the extending portion 83 of the present disclosure may be configured, for example, to extend toward a rear side of the seat, or to extend toward the front side and the rear side of the seat when the back side frame 72 is placed in the standing state.

In the above-described embodiments, the stopper 80, the extending portion 83, and the stopper fixing portion 84 are one-piece article. However, the present disclosure is not limited hereto. Specifically, for example, there may be a configuration in which one or more of components including the stopper 80, the extending portion 83, or the stopper fixing portion 84 may be manufactured as a component or components separated from the remaining component or components and thereafter integrated into the remaining component or components by welding or the like.

The extending portion 83 of the above-described embodiments has the approximately L-shaped section. However, the present disclosure is not limited hereto. Specifically, the extending portion 83 may be configured to have an I-shaped section, for example.

The extending portion 83 of the above-described embodiments is welded and fixed to the back side frame 72. However, the present disclosure is not limited hereto. For example, there may be a configuration in which the extending portion 83 is fastened to the back side frame 72 by a fastener, such as a screw, a rivet, or the like.

In the above-described embodiments, the stopper 80 and other components are applied to the back side frame 72 as an example. However, the present disclosure is not limited hereto. For example, the stopper 80 and other components are applicable to other back side frames, such as the back side frame 71, the back side frame 73, or the like.

In the above-described embodiments, the vehicle seat of the present disclosure is applied to a vehicle. The present disclosure should not be limited to a vehicle seat for a vehicle and may be applied to seats used in other vehicles, such as railroad vehicles, ships and boats, and aircrafts. Further, the present disclosure may be applied to built-in seats used in theaters, households, and the like.

Furthermore, the present disclosure should not be limited to the above-described embodiments as long as it falls within the spirit of the invention recited in the accompanying claims. Accordingly, the present disclosure may be configured in combination of at least two of the above-described embodiments or may be the above-described embodiments configured without either the configuration requirements described in the drawings or the elements described with reference numerals.

What is claimed is:

1. A back frame that forms a framework of a seatback, the back frame comprising:
a back side frame rotatable with respect to a cushion frame in seat front-rear directions;
a stopper fixed to the back side frame, wherein the stopper includes a contact portion configured to contact a contact target portion that is immobile with respect to the cushion frame, and wherein the stopper restricts rotation of the back side frame when the contact portion contacts the contact target portion;
a stopper fixing portion extending from the stopper toward a leading end of the back side frame in a longitudinal axis of the back side frame, wherein the stopper fixing portion is fixed to the back side frame; and
an extending portion extending from at least one of a front end or a rear end of the stopper in the seat front-rear directions, wherein the extending portion is fixed to the back side frame in at least a part of the extending portion,
wherein the extending portion includes:
a fixing wall portion fixed to the back side frame and shaped in a strip plate to extend in an extending direction of the extending portion; and
a reinforcing wall portion shaped in a strip plate to extend in the extending direction of the extending portion and to extend from the fixing wall portion in a direction crossing the fixing wall portion,
wherein a leading end of the stopper fixing portion in an extending direction of the stopper fixing portion is located closer to the leading end of the back side frame in the longitudinal axis of the back side frame than an end of the fixing wall portion of the extending portion in the extending direction of the stopper fixing portion is.

2. The back frame according to claim 1, wherein the stopper fixing portion is welded to the back side frame, and wherein the back frame further includes a welding area in which the extending portion is welded and fixed to the back side frame, wherein the welding area extends along an extending direction of the extending portion.

3. The back frame according to claim 1,
wherein the extending portion extends in a direction oriented from the contact portion toward the contact target portion when the contact portion is in contact with the contact target portion.

4. The back frame according to claim 1,
wherein the stopper fixing portion has a triangular shape, and a length in the seat front-rear directions of the stopper fixing portion is shorter at a higher position.

* * * * *